(12) United States Patent
Yu

(10) Patent No.: US 9,639,914 B2
(45) Date of Patent: May 2, 2017

(54) PORTRAIT DEFORMATION METHOD AND APPARATUS

(71) Applicant: TENCENT TECHNOLOGY (SHENZHEN) COMPANY LIMITED, Shenzhen (CN)

(72) Inventor: Sansi Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/215,924

(22) Filed: Jul. 21, 2016

(65) Prior Publication Data

US 2016/0328825 A1  Nov. 10, 2016

Related U.S. Application Data

(63) Continuation of application No. PCT/CN2015/081982, filed on Jun. 19, 2015.

(30) Foreign Application Priority Data

Jun. 19, 2014  (CN) .......................... 2014 1 0275849

(51) Int. Cl.
  *G06T 3/00* (2006.01)
  *G06T 11/60* (2006.01)
  *G06K 9/00* (2006.01)

(52) U.S. Cl.
  CPC ........ *G06T 3/0093* (2013.01); *G06K 9/00248* (2013.01); *G06T 3/0068* (2013.01); *G06T 11/60* (2013.01)

(58) Field of Classification Search
  None
  See application file for complete search history.

(56) References Cited

U.S. PATENT DOCUMENTS 6,069,634 A * 5/2000 Gibson ................... G06T 19/20
                                                   345/424
2002/0070945 A1 * 6/2002 Kage .................. G06K 9/00228
                                                   345/581

(Continued)

FOREIGN PATENT DOCUMENTS

CN   101551911 A   10/2009
CN   102393951 A   3/2012

OTHER PUBLICATIONS

The World Intellectual Property Organization (WIPO) International Search Report for PCT/CN2015/081982 Sep. 24, 2015 p. 1-3.

*Primary Examiner* — Ryan M Gray
(74) *Attorney, Agent, or Firm* — Anova Law Group, PLLC

(57) ABSTRACT

The present disclosure is applicable to the field of image processing, and provides a portrait deformation method and apparatus. The method includes: reading a picture including a portrait; detecting a facial feature of the portrait in the picture; deforming the detected facial feature according to preset control points, to obtain a corresponding deformation field, the number of the preset control points being greater than 1; and making the deformation field act on the picture, so as to convert the picture into a deformed picture. According to embodiments of the present invention, lines of a deformed portrait are more continuous.

18 Claims, 6 Drawing Sheets

(56) References Cited

U.S. PATENT DOCUMENTS

| | | | |
|---|---|---|---|
| 2003/0152288 A1* | 8/2003 | Balmelli | G06T 15/04 382/276 |
| 2009/0060290 A1* | 3/2009 | Sabe | G06K 9/00248 382/118 |
| 2013/0039599 A1* | 2/2013 | Aoki | G06T 5/006 382/276 |
| 2016/0217319 A1* | 7/2016 | Bhanu | G06K 9/00288 |

* cited by examiner

PORTRAIT DEFORMATION METHOD AND APPARATUS

CROSS-REFERENCES TO RELATED APPLICATIONS

This application is a continuation application of PCT Patent Application No. PCT/CN2015/081982, filed on Jun. 19, 2015, which claims priority to Chinese Patent Application No. 201410275849.X, entitled "PORTRAIT DEFORMATION METHOD AND APPARATUS" filed on Jun. 19, 2014, the entire contents of both of which are incorporated herein by reference.

FIELD OF THE TECHNOLOGY

The present disclosure relates to the field of image processing, and in particular, to a portrait deformation method and apparatus.

BACKGROUND OF THE DISCLOSURE

With the development of image processing technologies and popularity of intelligent terminals, a user has an increasingly strong wish of beautifying a portrait picture by using an intelligent terminal.

There are mainly two existing portrait picture deformation methods in the following:

1) A manual method: In this method, a user needs to manually select a size of a brush, and manually adjust a part that the user wishes to modify. Referring to FIG. 1, for example, to thin a face of a portrait, a user selects a suitable diameter for thinning a face, to obtain a face thinning range of a circle shown in FIG. 1, then locate the face thinning range in a to-be-deformed area, and finally, deform the to-be-deformed area. However, in this method, the user needs to perform the operations repeatedly to ensure that the operated face is bilaterally symmetrical and a face thinning effect is good, and requirements on the operating user is high.

2) An intelligent (automatic) method: In this method, a deformation range is automatically determined by using a face recognition algorithm, and then a deformation operation is automatically performed on the determined deformation range according to deformation strength that is selected by a user by using a strength progress bar. Although the user does not need to perform multiple operations in this method, a deformation effect is also not ideal if the selected deformation strength is incorrect. Using an existing automatic face thinning method as an example, assuming that a head portrait of a person before deformation is shown in FIG. 2*a*, the user drags the strength progress bar to control the deformation strength; assuming that deformation of thinning a face is performed on the head portrait in FIG. 2A by using the strongest deformation strength, an obtained effect drawing is shown in FIG. 2B. It may be seen from FIG. 2B that, the chin becomes smaller with strong deformation strength, but other parts of the face do not change well correspondingly, which causes that facial lines are not continuous enough, and therefore presents a poor effect. This is because in the existing method for automatically deforming a portrait picture, a deformation field is obtained by using one control point, and because the control point is used to deform only pixels in a surrounding area of the control point, when pixels in another area are not deformed correspondingly, lines in the entire deformation field are not continuous enough. The deformation field obtained by using one control point is shown in FIG. 3.

To sum up, when a portrait picture is manually deformed, operations are excessively complex, and when the portrait picture is automatically deformed, the portrait picture is deformed by using only one control point; as a result, lines in the deformed portrait picture are not continuous enough, and an effect is poor.

SUMMARY

Embodiments of the present invention provide a portrait deformation method, so as to solve a problem that in the existing method, when a portrait picture is automatically deformed, discontinuity of lines of a deformed portrait is easily caused, and an effect is poor.

The embodiments of the present invention are implemented in this way: A portrait deformation method is provided, including: reading a picture including a portrait; detecting a facial feature of the portrait in the picture; deforming the detected facial feature according to preset control points, to obtain a corresponding deformation field, the number of the preset control points being greater than 1; and making the deformation field act on the picture, so as to convert the picture into a deformed picture.

Another objective of the embodiments of the present invention is to provide a portrait deformation apparatus, including: a picture reading unit, configured to read a picture including a portrait; a face recognition unit, configured to detect a facial feature of the portrait in the picture; a deformation field determining unit, configured to deform the detected facial feature according to preset control points, to obtain a corresponding deformation field, the number of the preset control points being greater than 1; and a deformation field application unit, configured to make the deformation field act on the picture, so as to convert the picture into a deformed picture.

In the embodiments of the present invention, a facial feature of a portrait is deformed by simultaneously using multiple control points, lines of a deformed facial feature are more continuous, so that an effect after deformation is better, and user experience is improved.

Other aspects of the present disclosure can be understood by those skilled in the art in light of the description, the claims, and the drawings of the present disclosure.

DESCRIPTION OF EMBODIMENTS

In order to make the objectives, technical solutions, and advantages of the present disclosure more comprehensible, the present disclosure is described in further detail below with reference to the accompanying drawings and the embodiments. It should be understood that, specific embodiment described herein are merely used for explaining the present disclosure, and are not intended to limit the present disclosure.

In the embodiments of the present invention, a facial feature of a portrait is deformed by using multiple control points, to obtain a corresponding deformation field, and the obtained deformation field is made to act on a picture, so as to convert the picture into a deformed picture.

In order to describe the technical solutions of the present disclosure, specific embodiments are used below for description.

Embodiment 1

Figure 1:
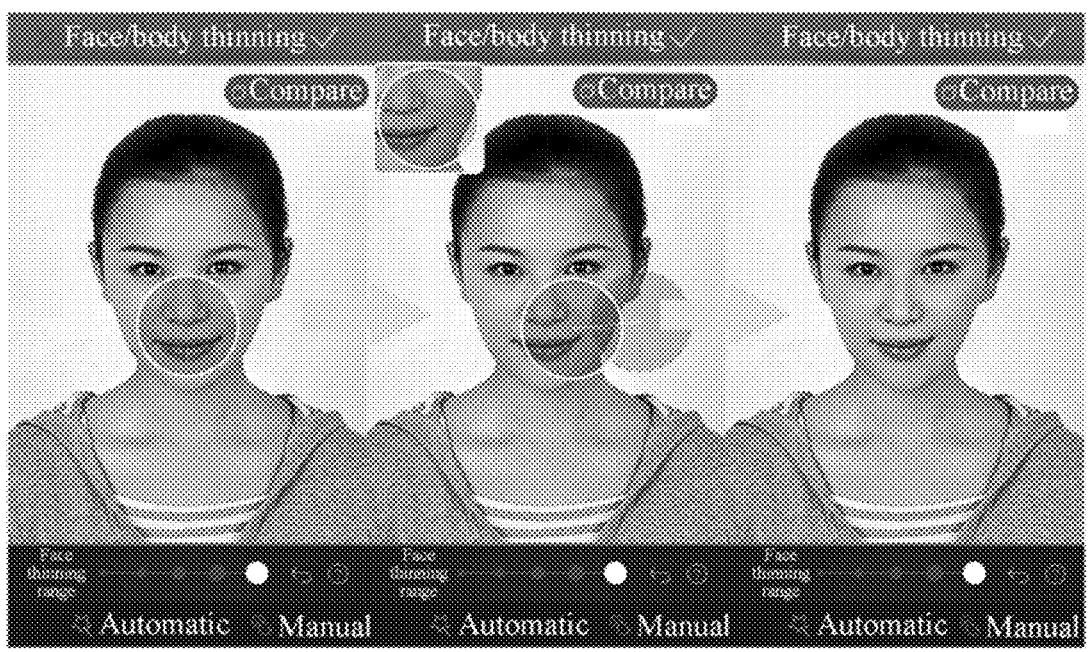
FIG. 1 is a schematic diagram of manually thinning a face according to the existing technology.
Figure 2A:
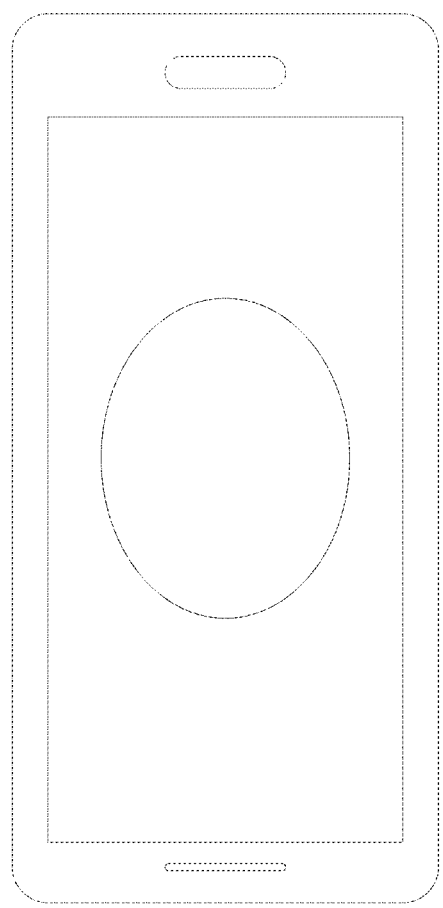
FIG. 2A is a schematic diagram of an image before a face is automatically thinned according to the existing technology.
Figure 2B:
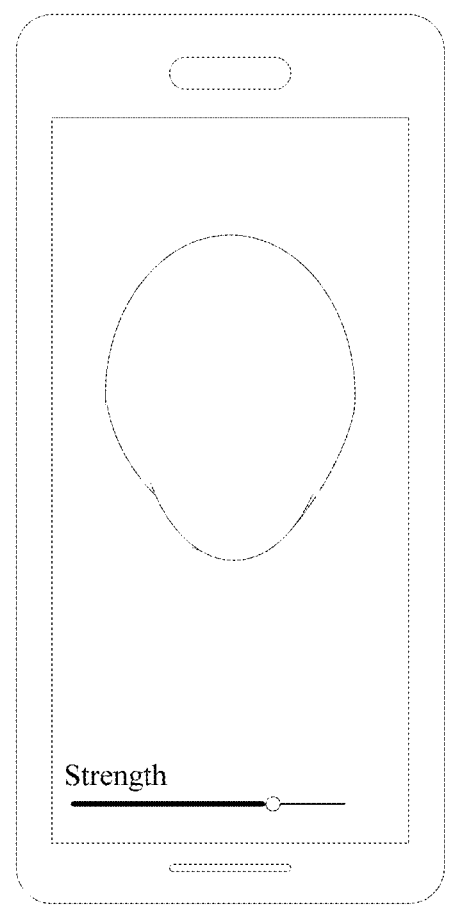
FIG. 2B is a schematic diagram of an image for automatically thinning a face by using strongest deformation strength according to the existing technology.
Figure 3:
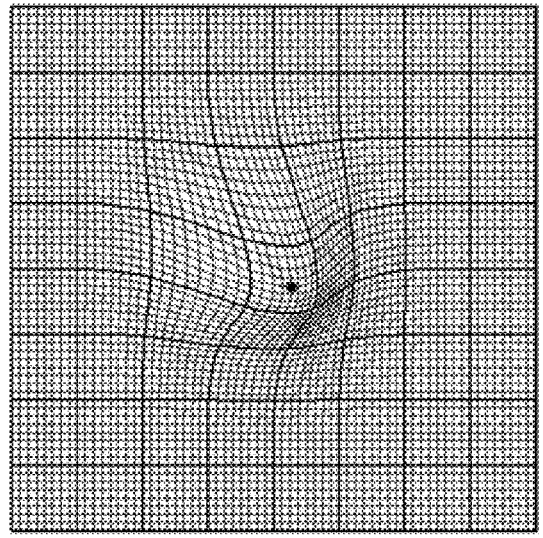
FIG. 3 is a schematic diagram of a deformation field obtained by using a single control point according to the existing technology.
Figure 4:
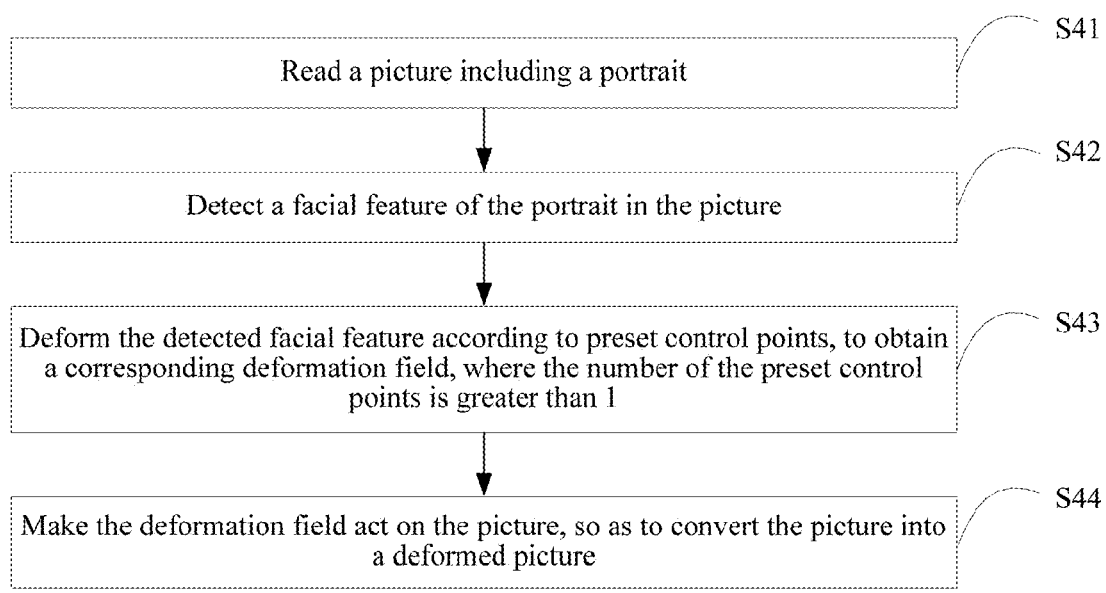
FIG. 4 is a flowchart of a portrait deformation method according to a first embodiment of the present invention.

FIG. 4 shows a flowchart of a portrait deformation method according to a first embodiment of the present invention. In this embodiment, an organ in a portrait is mainly deformed, for example, eyes of a person are enlarged, or a chin of a person is made smaller. Detailed description is as follows.

Step S41: Reading a picture including a portrait.

In this step, a picture that includes a to-be-deformed organ of portrait is read. Generally, the to-be-deformed organ is eyes, a chin, or the like, that is, the read picture may be a picture including only a face of a person, or may be a picture including the whole body of a person.

Step S42: Detecting a facial feature of the portrait in the picture.

In this step, the facial feature of the portrait is detected by using a method for detecting a facial feature. The facial feature includes at least one of the following: eyes, eyebrows, a nose, a mouth, a facial outline, and the like. Preferably, the facial feature, which is detected in this step, of the portrait is a facial feature to be deformed by a user, for example, when the user only needs to enlarge eyes, only positions of the eyes need to be detected, so as to increase a detection speed.

In an actual situation, different methods for detecting a facial feature may be selected according to requirements for a detection speed and matching precision. For example, when high matching precision is required, a multipoint face recognition method, such as an active shape model (ASM) method or an active appearance model (AAM) method may be selected. In this case, the step of detecting a facial feature of the portrait in the picture may further include the following.

A1: Selecting a method for detecting a facial feature, where the method for detecting a facial feature includes an ASM method or an AAM method. An ASM learns a shape change mode by using shape information of an object, and then performs shape deformation according to the learned change mode to search for a target in an image. An AAM establishes a presentation model by using information about both a shape and a texture, and also indicates a target in an image by using the learned change mode, where a found parameter is a parameter feature.

A2: Detecting the facial feature of the portrait in the picture by using the selected method for detecting a facial feature.

Step S43: Deforming the detected facial feature according to preset control points, to obtain a corresponding deformation field, where the number of the preset control points is greater than 1.

Before the facial feature is deformed, if a deformation strength specifying instruction sent by a user is received, control points are generated at positions of different facial features such as a mouth and eyes according to the deformation strength specifying instruction. When deformation strength obtained by the user by dragging a strength progress bar is different, at least one of the number and positions of the control points is also different, so as to control a deformation amount of the facial feature according to the deformation strength specified by the user. Because each control point has impact on a facial feature near the control point, after a control point is set, deformation of a facial feature in a surrounding area of the control point may be controlled, and when control force of multiple control points simultaneously acts on the facial feature, a superimposition effect is more natural.

As another embodiment of the present invention, the step of deforming the detected facial feature according to preset control points, to obtain a corresponding deformation field may further include the following steps.

B1: Determining a size of the picture including the portrait, where the size of the picture is indicated by the number of pixels. In this step, the size of the read picture including the portrait is determined, and the size of the picture is in a unit of pixels, for example, when the size of the picture is 1600*1200, it indicates that a length of the picture is 1600 pixels, and a width is 1200 pixels.

B2: Determining deformation amounts of all the preset control points, where the deformation amount of each control point is a two-dimensional vector. In this step, the deformation amount of a control point is denoted by two-dimensional vector, including a deformation vector of the control point in the x-axis and a deformation vector of the control point in the y-axis. In some embodiments, a range of the deformation amount of each preset control point may be preset according to its corresponding organ type (e.g., eye, chin) or a user-selected deformation category (e.g., eye enlarging, face thinning). Further, a user may select a deformation strength on a user interface (e.g., using a sliding bar). Thus, the deformation amounts of the preset control points may be obtained based on the preset range and the user-selected deformation strength.

B3: Dividing the picture including the portrait into multiple grids according to the size of the picture and the deformation amount of the control point. The grids obtained through division may be triangular grids, quadrangular grids, pentagonal grids, or the like, which is not limited herein. In this step, a value related to the deformation amount of the control point is selected as a division threshold, then the size of the picture is compared with the division threshold, and the picture is divided into grids whose number is equal to a result of the comparison. Specifically, step B3 may further include the following.

B31: Selecting a maximum value from the deformation amounts of all the preset control points. In this step, after the deformation vectors of all the control points in the x-axis and the deformation vectors of all the control points in the y-axis are determined, the deformation vectors of all the control points in the x-axis are compared with the deformation vectors of all the control points in the y-axis, to obtain a maximum value of the deformation vectors of all the control points in the x-axis and the y-axis. For example, assuming that there are two control points, a value of a deformation vector of a control point A in the x-axis is 10, a value of a deformation vector of the control point A in the y-axis is 20, a value of a deformation vector of a control point B in the x-axis is 10, and a value of a deformation vector of the control point B in the y-axis is 40, then a maximum value of the deformation vectors of the control point A and the control point B in the x-axis and in the y-axis is "40".

B32: Dividing the picture including the portrait into multiple grids according to the size of the picture and the selected maximum value. In this step, assuming that the size of the picture is 1600*1200 pixels, and a maximum value of horizontal coordinates and vertical coordinates of all the control points is 40, the picture may be divided into 40*30 grids (e.g., the size of each quadrangular grid is 40 pixels by 40 pixels). Further, if the maximum value of the horizontal coordinates and the vertical coordinates of all the control points cannot be exactly divided by the size of the picture, a number greater than the maximum value of the horizontal coordinates and the vertical coordinates of all the control points is selected, and the selected number is a common divisor of the size of the picture (e.g., a common divisor of the length and the width of the picture), to replace the maximum value of the horizontal coordinates and the vertical coordinates of all the control points, so as to ensure that the number of the grids obtained through division is an integer.

B4: Determining a grid deformation field according to the preset control points and a preset spline function. In this step, the step of determining a grid deformation field according to the preset control points and a preset spline function specifically may further include the following.

B41: Determining, according to a deformation amount of a control point, deformation amounts of grid vertexes of a grid to which the control point belongs. In this step, if the picture is divided into triangular grids, deformation amounts of three grid vertexes of a triangular grid to which the control point belongs need to be determined; if the picture is divided into quadrangular grids, deformation amounts of four grid vertexes of a quadrangular grid to which the control point belongs need to be determined; and, the picture may also be divided into pentagonal grids, and deformation amounts of five grid vertexes of a pentagonal grid are determined, which is not limited herein.

Figure 5:
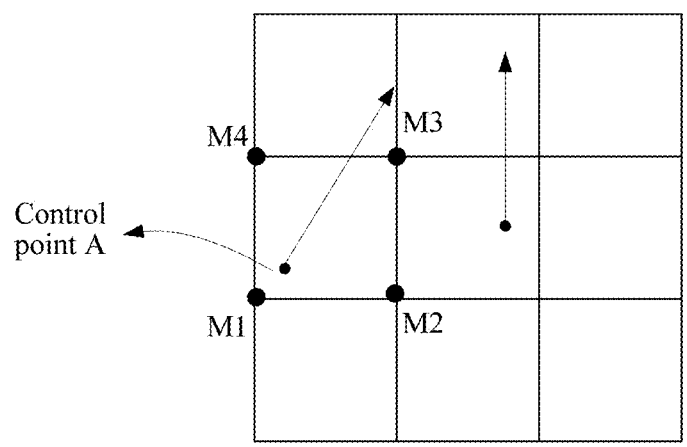
FIG. 5 is a schematic diagram of projection of a control point according to a first embodiment of the present invention.

Preferably, in this embodiment of the present invention, the picture is divided into quadrangular grids, so as to increase a speed of determining coordinates of the four grid vertexes in a grid. As shown in FIG. 5, a deformation amount of the control point A is transmitted to four grid vertexes M1, M2, M3, and M4. A size of a deformation amount transmitted by a control point is determined according to a relative position of the control point in a grid. When one grid has multiple control points, four grid vertexes of the grid are affected by deformation amounts of the multiple control points, that is, a deformation amount of one grid vertex is the sum of the deformation amounts transmitted by the multiple control points. Specifically, a deformation vector that corresponds to the deformation amount transmitted by the deformation amount of one control point to the four grid vertexes is determined according to the following formula:

$$w(u, v) = \sum_{k=0}^{3} \sum_{l=0}^{3} B_k(s) B_l(t) \Phi'_{i,j}$$

where, $w(u, v)$ is a deformation vector corresponding to a deformation amount of a deformed grid vertex, where u and v are coordinates of a grid vertex before deformation, $\Phi'_{i,j}$ is a deformation amount of a control point, where i and j refer to relative coordinates, of the control point in the grid and the grid vertex, and $B_k(s)$ and $B_l(t)$ are cubic B-splines, where s and t are values generated by normalizing the relative coordinates of the control point in the grid and the grid vertex. Expressions of $B_l(t)$ are listed below, and expressions of $B_k(s)$ are the similar as those of $B_l(t)$, which are not described herein again:

$B_0(t)=(-t^3+3t^2-3t+1)/6, B_1(t)=(3t^3+6t^2+4)/6, B_2(t)=(-3t^3+3t^2+3t+1)/6,$ and $B_3(t)=t^3/6,$ where $0 \leq t < 1.$ In some embodiments, when a grid vertex is affected by multiple control points, the deformation amount of the grid vertex may be a summation of multiple deformation vectors respectively corresponding to the multiple control points.

B42: Determining a deformation amount of a current control point according to the determined deformation amounts of the grid vertexes of the grid. In this step, the deformation amount of the control point may be reversely calculated by using the deformation amounts of the grid vertexes of the grid, so as to verify whether the deformation amount, which is obtained through calculation, of the control point is the same as a deformation amount of a preset control point. Specifically, the deformation amount of the control point is determined according to a relative position of the control point in the grid, and a shorter distance from the control point to a grid vertex indicate a greater effect of the grid vertex on the control point. In some embodiments, when a grid vertex is deformed under the influence of multiple control points, the deformation amount of one of the multiple control point calculated using the deformation amounts of the grid vertexes may be different from the deformation amount of this control point determined in step B2. For example, in FIG. 5, the deformation amounts of vertexes M2 and M3 are obtained from two control points. Accordingly, when reversely calculating the current deformation amount of control point A using deformation amounts of M1, M2, M3, and M4, the calculation result may be different from the deformation amount of control point A originally determined in step B2.

B43: Subtracting the deformation amount, which is determined after the grid is deformed, of the current control point (e.g., the deformation amount of the control point calculated using deformation amounts of the grid vertexes in step B42) from the deformation amount of the control point before the grid is deformed (e.g., the deformation amount of same control point determined in step B2 or B44), to obtain a remaining deformation amount of the control point. In this step, a deformation amount threshold may be preset, the deformation amount threshold is ½ of the deformation amount of the current control point, and if an obtained remaining deformation amount of the control point is greater than the deformation amount threshold, the deformation amount threshold is used as the remaining deformation amount of the control point. For example, when the preset deformation amount threshold is ½ of the deformation amount of the control point before the current grid is deformed, it is assumed that the deformation amount of the control points before the grid is deformed is 160, the deformation amount threshold is 160*½=80, and the deformation amount, which is determined after the grid is deformed, of the current control point is 120. Because 120 is greater than 80, a value of the remaining deformation amount of the control point is 80.

B44: Determining whether the remaining deformation amount of the control point meets a precision requirement, if yes, use a grid field formed by multiple grids formed by determined deformation amounts of grid vertexes of grids to which control points belong as the grid deformation field, and if not, use the remaining deformation amount of the control point as a new deformation amount of the control point, and go back to step B41. For example, assuming that the remaining deformation amount of the control point is (20,10), and a precision requirement is (5,5), then deformation of the grid needs to be continued.

B5: Determining a pixel deformation field according to the grid deformation field and relative positions of pixels in a grid before the grid is deformed. In this step, the pixel deformation field refers to a pixel combination obtained after shape deformation occurs in original pixels in the picture in positions and/or numerical values. Preferably, when the current control point meets the precision requirement, the step of determining a pixel deformation field according to the grid deformation field and relative positions of pixels in a grid before the grid is deformed may further include the following.

C1: Determining a relative position of a pixel in a deformed grid after each free-from deformation (FFD). In this step, a basic idea of FFD is to perform deformation by manipulating a spatial parallel dot matrix including an object, the manipulated spatial matrix determines a deformation function of the object, and the deformation function specifies a new position of each point of the object. Specifically, the step of determining a relative position of a pixel in a deformed grid after each FFD may further include the following.

C11: Determining a relative position of the pixel to a grid vertex, closest to the pixel, of the grid before the grid is deformed. In other words, a first relative position of the pixel to grid vertexes of a grid before deformation is determined, the grid being closest to the pixel.

C12: Determining a relative position of the grid vertex of the grid before the grid is deformed to a grid vertex that is obtained after the grid vertex of the grid before the grid is deformed is deformed. In other words, second relative positions of the grid vertexes before deformation and after deformation are determined.

C13: Determining the relative position of the pixel in the deformed grid according to the determined relative position of the pixel to the grid vertex, closest to the pixel of the grid before the grid is deformed and the relative position of the grid vertex of the grid before the grid is deformed to the grid vertex that is obtained after the grid vertex of the grid before the grid is deformed is deformed. In other words, according to the first relative position and the second relative positions, the relative position of the pixel to the grid vertexes after deformation is determined.

In the foregoing step C11 to step C13, when the grid obtained through division is quadrangular, calculation related to the grid vertex refers to calculation related to four grid vertexes, where a position of a pixel is obtained by performing interpolation calculation on the four grid vertexes of the deformed grid. Definitely, when the grid obtained through division is pentagonal, calculation related to the grid vertex refers to calculation related to five grid vertexes, which is not described herein again.

C2: Superimposing the determined relative positions of the pixel in the deformed grid after each FFD, to obtain the pixel deformation field. For example, assuming that after a first FFD, coordinates of a pixel v are (1,2), and after a second FFD, coordinates of the pixel v are (2,4), then a final position of the pixel v is (2,6).

B6: Combining the grid deformation field and the pixel deformation field, to obtain the deformation field of the facial feature. Preferably, the grid deformation field and the pixel deformation field may be separately determined by using two image processors gpu shaders having colorisers, so as to increase a processing speed. Further, the grid deformation field obtained through first calculation may be reused, and the grid deformation field obtained through reusing can greatly reduce a time for deforming a portrait. For example, by using the technical solution, if only a face thinning operation needs to be performed on the portrait, it only takes 20 ms. A reason that the grid deformation field can be reused is as follows: Because the number of grid vertexes is small, and in an actual application, all numerical values of coordinates of a grid are stored, there is hardly any error in the grid deformation field obtained through the first calculation, and subsequent reusing will not increase the error. For example, it is assumed that a first grid deformation field is calculated, and if a grid deformation field needing to be calculated subsequently is half of the first grid deformation field, the grid deformation field needing to be calculated subsequently may be directly obtained by multiplying the first grid deformation field by ½, which greatly reduces the calculation workload.

Step S44: Making the deformation field act on the picture, so as to convert the picture into a deformed picture. In other words, the deformed picture may be obtained by imposing the deformation field on the picture.

Figure 6:
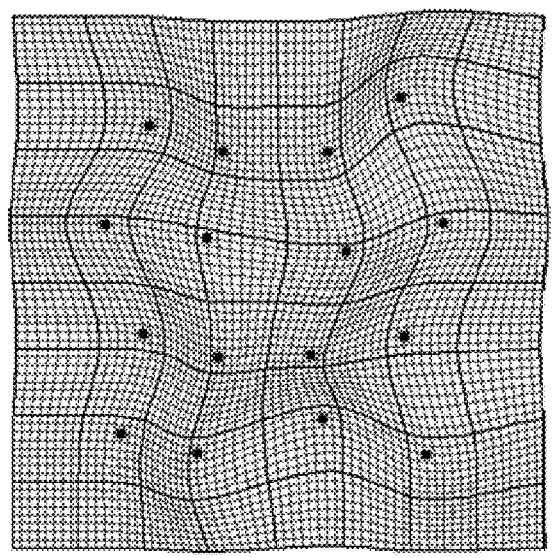
FIG. 6 is a schematic diagram of a deformation field obtained by using multiple control points according to a first embodiment of the present invention.

Referring to FIG. 6, FIG. 6 shows a schematic diagram of a deformation field obtained by using multiple control points. Because the deformation field is obtained through a combined action of the multiple control points, lines of the obtained deformation field are more continuous and more natural.

In the first embodiment of the present invention, a facial feature of a portrait is deformed by using multiple control points, to obtain a corresponding deformation field, and then the obtained deformation field is made to act on a picture, to obtain a deformed picture. The facial feature of the portrait is deformed by simultaneously using multiple control points, lines of the deformed facial feature are more continuous and gentler, so that an effect after deformation is better, and user experience is improved.

Embodiment 2

Figure 7:
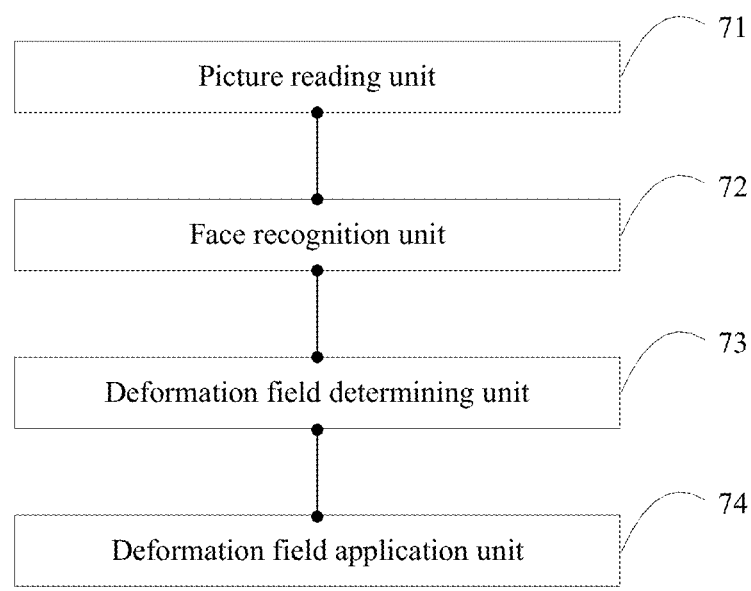
FIG. 7 is a structural diagram of a portrait deformation apparatus according to a second embodiment of the present invention.

FIG. 7 is a structural diagram of a portrait deformation apparatus according to a second embodiment of the present invention. For ease of description, only a part related to this embodiment of the present invention is shown.

The portrait deformation apparatus includes: a picture reading unit 71, a face recognition unit 72, a deformation field determining unit 73, and a deformation field application unit 74.

The picture reading unit 71 is configured to read a picture including a portrait.

The read picture may be a picture including only a face of a person, or may be a picture including the whole body of a person.

The face recognition unit 72 is configured to detect a facial feature of the portrait in the picture.

The facial feature includes at least one of the following: eyes, eyebrows, a nose, a mouth, a facial outline, and the like. Preferably, the facial feature, which is detected in this step, of the portrait is a facial feature to be deformed by a user.

As a preferred embodiment of the present invention, the face recognition unit 72 includes: a face recognition algorithm selection module and a face detection module.

The face recognition algorithm selection module is configured to select a method for detecting a facial feature, where the method for detecting a facial feature is an ASM method or an AAM method.

The face detection module is configured to detect the facial feature of the portrait in the picture by using the selected method for detecting a facial feature.

The deformation field determining unit 73 is configured to deform the detected facial feature according to preset control points, to obtain a corresponding deformation field, where the number of the preset control points is greater than 1.

Multiple control points are preset, so as to control deformation of the facial feature in an area near the control points.

As another preferred embodiment of the present invention, the deformation field determining unit 73 includes: a picture size determining module, a control point position determining module, a picture division module, a grid deformation field determining module, a pixel deformation field determining module, and a deformation field combination module.

The picture size determining module is configured to determine a size of the picture including the portrait, where the size of the picture is indicated by the number of pixels.

The control point position determining module is configured to determine deformation amounts of all the preset control points, where the deformation amount of the control point is two-dimensional vectors. The deformation amount of the preset control point is two-dimensional vectors, including a deformation vector of the control point in the x-axis and a deformation vector of the control point in the y-axis.

The picture division module is configured to divide the picture including the portrait into multiple grids according to the size of the picture and the deformation amount of the control point.

The grids obtained through division may be triangular grids, quadrangular grids, pentagonal grids, or the like, which is not limited herein.

As another preferred embodiment of the present invention, the picture division module includes: a maximum value selection module and a picture gridding module. The maximum value selection module is configured to select a maximum value from the deformation amounts of all the preset control points. The selected maximum value is a maximum value of the deformation amounts of all the preset control points. The picture gridding module is configured to divide the picture including the portrait into multiple grids according to the size of the picture and the selected maximum value.

The grid deformation field determining module is configured to determine a grid deformation field according to the preset control points and a preset spline function. Preferably, if the maximum value of the deformation amounts of all the control points cannot be exactly divided by the size of the picture, a number greater than the maximum value of the deformation amounts of all the control points is selected, and the selected number is a common divisor of the size of the picture, to replace the maximum value of the deformation amounts of all the control points, so as to ensure that the number of the grids obtained through division is an integer.

As another preferred embodiment of the present invention, the grid deformation field determining module includes: a control point projection module, a current control point deformation amount determining module, a control point remaining deformation amount determining module, and a grid deformation field determining module.

The control point projection module is configured to determine, according to a deformation amount of a control point, deformation amounts of grid vertexes of a grid to which the control point belongs. Specifically, a deformation vector that corresponds to the deformation amount transmitted by the deformation amount of the control point to the four grid vertexes is determined according to the following formula:

$$w(u, v) = \sum_{k=0}^{3} \sum_{l=0}^{3} B_k(s) B_l(t) \Phi'_{i,j}$$

where, w(u, v) is a deformation vector corresponding to a deformation amount of a deformed grid vertex, where u and v are coordinates of a grid vertex before deformation, $\Phi'_{i,j}$ is a deformation amount of a control point, where i and j refer to relative coordinates, of a control point falling in a grid to the grid vertex, and $B_l(t)$ and $B_l(t)$ are cubic B-splines, where s and t are values generated by normalizing the relative coordinates of the control point falling in the grid to the grid vertex, only expressions of $B_l(t)$ are listed below, and expressions of $B_k(s)$ are the same as those of $B_l(t)$, which are not described herein again:

$B_0(t)=(-t^3+3t^2-3t+1)/6, B_1(t)=(3t^3+6t^2+4)/6, B_2(t)=(-3t^3+3t^2+3t+1)/6,$ and $B_3(t)=t^3/6$, where $0 \le t < 1$.

A deformation control point determining module is configured to obtain a deformed control point after a FFD is performed on the control point.

The current control point deformation amount determining module is configured to determine a deformation amount of a current control point according to the determined deformation amounts of the grid vertexes of the grid.

The control point remaining deformation amount determining module is configured to subtract the deformation amount, which is determined after the grid is deformed, of the current control point from the deformation amount of the control point before the grid is deformed, to obtain a remaining deformation amount of the control point. A deformation amount threshold may be preset, the deformation amount threshold is ½ of the deformation amount of the current control point, and if an obtained remaining deformation amount of the control point is greater than the deformation amount threshold, the deformation amount threshold is used as the remaining deformation amount of the control point.

The grid deformation field determining module is configured to determine whether the remaining deformation amount of the control point meets a precision requirement, if yes, use a grid field formed by multiple grids formed by determined deformation amounts of grid vertexes of grids to which control points belong as the grid deformation field, and if not, use the remaining deformation amount of the control point as a new deformation amount of the control point, and go back to the control point projection module.

The pixel deformation field determining module is configured to determine a pixel deformation field according to the grid deformation field and relative positions of pixels in a grid before the grid is deformed.

The deformation field combination module is configured to combine the grid deformation field and the pixel deformation field, to obtain the deformation field of the facial feature.

Preferably, the grid deformation field and the pixel deformation field may be separately determined by using two image processors gpu shaders having colorisers, so as to increase a processing speed. Further, the grid deformation field obtained through first calculation may be reused, and the grid deformation field obtained through reusing can greatly reduce a time for deforming a portrait.

The deformation field application unit 74 is configured to make the deformation field act on the picture, so as to convert the picture into a deformed picture.

In the second embodiment of the present invention, a facial feature of a portrait is deformed by using multiple control points, to obtain a corresponding deformation field, and then the obtained deformation field is made to act on a picture, to obtain a deformed picture. The facial feature of the portrait is deformed by simultaneously using multiple control points, lines of the deformed facial feature are more continuous and gentler, so that an effect after deformation is better, and user experience is improved.

As another preferred embodiment of the present invention, when the current control point meets the precision requirement, the pixel deformation field determining module includes: a pixel position determining module after a single FFD, configured to determine a relative position of a pixel in a deformed grid after each FFD.

As another preferred embodiment of the present invention, the pixel position determining module after a single FFD includes: a module for determining a relative position of a pixel to a grid vertex before the grid is deformed, a module for determining a relative position of a grid vertex before and after the grid is deformed, and a pixel position determining module.

The module for determining a relative position of a pixel to a grid vertex before the grid is deformed is configured to determine a relative position of the pixel to a grid vertex, closest to the pixel, of the pixel before the grid is deformed.

The module for determining a relative position of a grid vertex before and after the grid is deformed is configured to determine a relative position of the grid vertex of the grid before the grid is deformed to a grid vertex that is obtained after the grid vertex of the grid before the grid is deformed is deformed.

The pixel position determining module is configured to determine the relative position of the pixel in the deformed grid according to the determined relative position of the pixel to the grid vertex, closest to the pixel, of the grid before the grid is deformed and the relative position of the grid vertex of the grid before the grid is deformed to the grid vertex that is obtained after the grid vertex of the grid before the grid is deformed is deformed. When the grid obtained through division is quadrangular, calculation related to the grid vertex refers to calculation related to four grid vertexes, where a position of a pixel is obtained by performing interpolation calculation on the four grid vertexes of the deformed grid. Definitely, when the grid obtained through division is pentagonal, calculation related to the grid vertex refers to calculation of five grid vertexes, which is not described herein again.

The pixel position determining module after multiple FFDs is configured to superimpose the determined relative position of the pixel in the deformed grid after each FFD, to obtain the pixel deformation field.

In the foregoing modules, the pixel deformation field is obtained by superimposing multiple FFDs.

Figure 8:
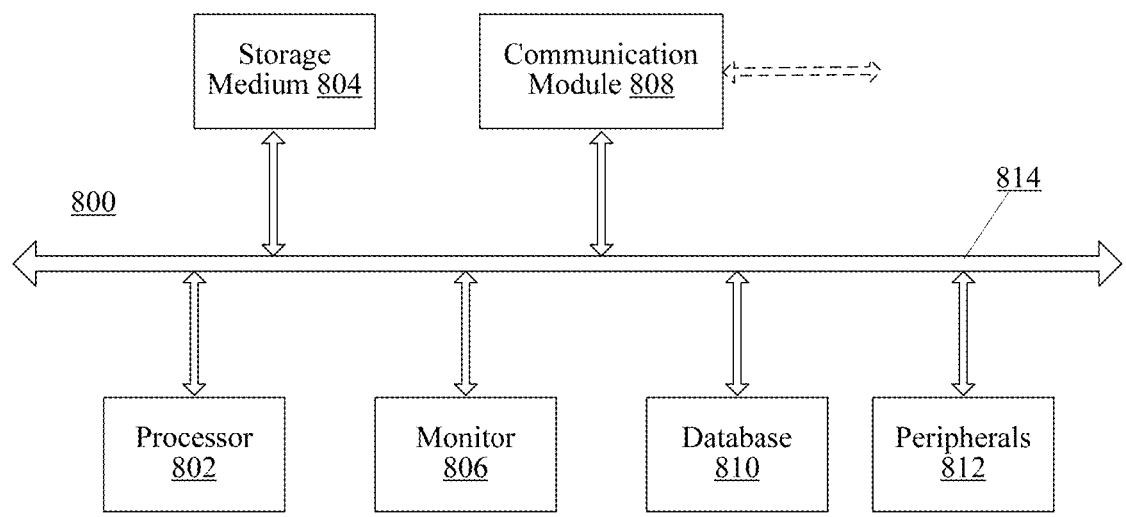
FIG. 8 illustrates a block diagram of an exemplary computer system consistent with the disclosed embodiments.

The disclosed portrait deformation apparatus method, portrait deformation apparatus, and/or various disclosed modules and units may be implemented using one or more computing systems. FIG. 8 illustrates an exemplary computing system consistent with the disclosed embodiments.

As shown in FIG. 8, a computing system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The processor 802 may further include a graphics processing unit (GPU). The storage medium 804 may include memory modules, e.g., Read-Only Memory (ROM), Random Access Memory (RAM), and flash memory modules, and mass storages, e.g., CD-ROM, U-disk, removable hard disk, etc. The storage medium 804 may store computer programs for implementing various processes (e.g., image processing, recognizing facial features, determining deformation field, deforming a picture, etc.), when executed by the processor 802.

The monitor 806 may include display devices for displaying contents in the computing system 800, such as displaying a software interface for obtaining portrait images and portrait image processing (e.g., eye enlarging, face thinning). The peripherals 812 may include I/O devices, e.g., touchscreen, keyboard and mouse for inputting information by a user. The peripherals may also include certain sensors, such as camera, speaker, microphone, etc.

Further, the communication module 808 may include network devices for establishing connections through a communication network such as Internet or other types of computer networks or telecommunication networks, either wired or wireless. The database 810 may include one or more databases for storing certain data (e.g., portrait pictures, facial feature recognition settings, deformation control points and grid settings, etc.) and for performing certain operations on the stored data.

In operation, the processor 802 may receive a portrait picture obtained from the storage medium 804, captured by the camera 812, or obtained online through the communication module 808. The monitor 806 may display, on a user interface, the portrait picture and multiple portrait image adjustment options (e.g., eye enlarging, face thinning, leg stretching, etc.). The user may select one option, and input an adjustment strength (e.g. deformation amount) with a sliding bar on the user interface through a touch screen or a mouse 812. As the user slides the sliding bar, the processor 802 may calculate a deformed picture based on the user input and output the deformed picture for display. Thus, the user may see the deformation effect of the portrait picture in real time.

A person of ordinary skill in the art may understand that all or some of the steps of the method according to foregoing embodiments may be implemented by a program instructing relevant hardware. The program may be stored in a computer readable storage medium. The storage medium may be a ROM/RAM, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A portrait deformation method, comprising:
reading a picture comprising a portrait;
detecting a facial feature of the portrait in the picture;
deforming the detected facial feature according to preset control points, to obtain a corresponding deformation field, the number of the preset control points being greater than 1; and
making the deformation field act on the picture, so as to convert the picture into a deformed picture;
wherein the step of deforming the detected facial feature according to preset control points, to obtain a corresponding deformation field further comprises:
determining a size of the picture comprising the portrait, wherein the size of the picture is indicated by the number of pixels;
determining deformation amounts of all the preset control points, wherein the deformation amounts of the control points are two-dimensional vectors;
dividing the picture comprising the portrait into multiple grids according to the size of the picture and the deformation amounts of the preset control points;
determining a grid deformation field according to the preset control points and a preset spline function, wherein: when a difference amount between deformation amounts of a preset control point before and after the corresponding grid is deformed meets a precision requirement, the grid deformation field is determined as a grid field formed by multiple grids formed by deformation amounts of grid vertexes of grids corresponding the preset control points; and when the difference amount does not meet the precision requirement, the difference amount is used as an updated deformation amount of the preset control point for deforming the corresponding grid and calculating an updated difference amount, until the updated difference amount is determined to meet the precision requirement;
determining a pixel deformation field according to the grid deformation field and relative positions of pixels in a grid before the grid is deformed; and
combining the grid deformation field and the pixel deformation field, to obtain the deformation field of the facial feature.

2. The method according to claim 1, wherein the step of detecting a facial feature of the portrait in the picture further comprises:
selecting a method for detecting a facial feature, wherein the method for detecting a facial feature is an active shape model (ASM) method or an active appearance model (AAM) method; and
detecting the facial feature of the portrait in the picture by using the selected method for detecting a facial feature.

3. The method according to claim 1, wherein the step of dividing the picture comprising the portrait into multiple grids according to the size of the picture and the deformation amounts of the preset control points further comprises:
selecting a maximum value from the deformation amounts of all the preset control points; and
dividing the picture comprising the portrait into multiple grids according to the size of the picture and the selected maximum value.

4. The method according to claim 1, wherein the step of determining a grid deformation field according to the preset control points and a preset spline function further comprises:
step A: determining, according to a deformation amount of a control point, deformation amounts of grid vertexes of a grid to which the control point belongs;
step B: determining a deformation amount of a current control point according to the determined deformation amounts of the grid vertexes of the grid;
step C: subtracting the deformation amount, which is determined after the grid is deformed, of the current control point from the deformation amount of the control point before the grid is deformed, to obtain a remaining deformation amount of the control point; and
step D: determining whether the remaining deformation amount of the control point meets a precision requirement, if yes, using a grid field formed by multiple grids formed by determined deformation amounts of grid vertexes of grids to which control points belong as the grid deformation field, and if not, using the remaining deformation amount of the control point as a new deformation amount of the control point, and going back to step A.

5. The method according to claim 1, wherein when the current control point meets the precision requirement, the step of determining a pixel deformation field according to the grid deformation field and relative positions of pixels in a grid before the grid is deformed further comprises:
determining a relative position of a pixel in a deformed grid after each free-form deformation (FFD); and
superimposing the determined relative position of the pixel in the deformed grid after each FFD, to obtain the pixel deformation field.

6. The method according to claim 5, wherein the step of determining a relative position of a pixel in a deformed grid after each FFD further comprises:
determining a relative position of the pixel to a grid vertex, closest to the pixel, of the grid before the grid is deformed;
determining a relative position of the grid vertex of the grid before the grid is deformed to a grid vertex that is obtained after the grid vertex of the grid is deformed; and
determining the relative position of the pixel in the deformed grid according to the determined relative position of the pixel to the grid vertex, closest to the pixel, of the grid before the grid is deformed and the relative position of the grid vertex of the grid before the grid is deformed to the grid vertex that is obtained after the grid vertex of the grid before the grid is deformed is deformed.

7. A portrait deformation apparatus, comprising:
one or more processors;
memory; and
a plurality of program modules stored in the memory and to be executed by the one or more processors, the plurality of program modules further comprising:
a picture reading unit, configured to read a picture comprising a portrait;
a face recognition unit, configured to detect a facial feature of the portrait in the picture;
a deformation field determining unit, configured to deform the detected facial feature according to preset control points, to obtain a corresponding deformation field, the number of the preset control points being greater than 1; and a deformation field application unit, configured to make the deformation field act on the picture, so as to convert the picture into a deformed picture;

wherein the deformation field determining unit comprises:

a picture size determining module, configured to determine a size of the picture comprising the portrait, wherein the size of the picture is indicated by the number of pixels;

a control point position determining module, configured to determine deformation amounts of all the preset control points, wherein the deformation amounts of the control points are two-dimensional vectors;

a picture division module, configured to divide the picture comprising the portrait into multiple grids according to the size of the picture and the deformation amounts of the preset control points;

a grid deformation field determining module, configured to determine a grid deformation field according to the preset control points and a preset spline function, wherein: when a difference amount between deformation amounts of a preset control point before and after the corresponding grid is deformed meets a precision requirement, the grid deformation field is determined as a grid field formed by multiple grids formed by deformation amounts of grid vertexes of grids corresponding the preset control points; and when the difference amount does not meet the precision requirement, the difference amount is used as an updated deformation amount of the preset control point for deforming the corresponding grid and calculating an updated difference amount, until the updated difference amount is determined to meet the precision requirement;

a pixel deformation field determining module, configured to determine a pixel deformation field according to the grid deformation field and relative positions of pixels in a grid before the grid is deformed; and a deformation field combination module, configured to combine the grid deformation field and the pixel deformation field, to obtain the deformation field of the facial feature.

8. The apparatus according to claim 7, wherein the face recognition unit comprises:

a face recognition algorithm selection module, configured to select a method for detecting a facial feature, wherein the method for detecting a facial feature is an active shape model (ASM) method or an active appearance model (AAM) method; and a face detection module, configured to detect the facial feature of the portrait in the picture by using the selected method for detecting a facial feature.

9. The apparatus according to claim 7, wherein the picture division module comprises:

a maximum value selection module, configured to select a maximum value from the deformation amounts of all the preset control points; and a picture gridding module, configured to divide the picture comprising the portrait into multiple grids according to the size of the picture and the selected maximum value.

10. The apparatus according to claim 7, wherein the grid deformation field determining module comprises:

a control point projection module, configured to determine, according to a deformation amount of a control point, deformation amount of grid vertexes of a grid to which the control point belongs;

a current control point deformation amount determining module, configured to determine a deformation amount of a current control point according to the determined deformation amounts of the grid vertexes of the grid;

a control point remaining deformation amount determining module, configured to subtract the deformation amount, which is determined after the grid is deformed, of the current control point from the deformation amount of the control point before the grid is deformed, to obtain a remaining deformation amount of the control point; and a grid deformation field determining module, configured to determine whether the remaining deformation amount of the control point meets a precision requirement, if yes, use a grid field formed by multiple grids formed by determined deformation amounts of grid vertexes of grids to which control points belong as the grid deformation field, and if not, use the remaining deformation amount of the control point as a new deformation amount of the control point, and go back to the control point projection module.

11. The apparatus according to claim 7, wherein when the current control point meets the precision requirement, the pixel deformation field determining module comprises:

a pixel position determining module after a single free-form deformation (FFD), configured to determine a relative position of a pixel in a deformed grid after each FFD; and a pixel position determining module after multiple FFDs, configured to superimpose the determined relative position of the pixel in the deformed grid after each FFD, to obtain the pixel deformation field.

12. The apparatus according to claim 11, wherein the pixel position determining module after a single FFD comprises:

a module for determining a relative position of a pixel to a grid vertex before the grid is deformed, configured to determine a relative position of the pixel to a grid vertex, closest to the pixel, of the pixel before the grid is deformed;

a module for determining a relative position of a grid vertex before and after the grid is deformed, configured to determine a relative position of the grid vertex of the grid before the grid is deformed to a grid vertex that is obtained after the grid vertex of the grid before the grid is deformed is deformed; and a pixel position determining module, configured to determine the relative position of the pixel in the deformed grid according to the determined relative position of the pixel to the grid vertex, closest to the pixel, of the grid before the grid is deformed and the relative position of the grid vertex of the grid before the grid is deformed to the grid vertex that is obtained after the grid vertex of the grid is deformed.

13. A non-transitory computer readable storage medium having stored therein one or more instructions, which, when executed by a terminal device, cause the terminal device to:

read a picture comprising a portrait;

detect a facial feature of the portrait in the picture;

deform the detected facial feature according to preset control points, to obtain a corresponding deformation field, the number of the preset control points being greater than 1; and make the deformation field act on the picture, so as to convert the picture into a deformed picture;

wherein deforming the detected facial feature according to preset control points, to obtain a corresponding deformation field further comprises:

determining a size of the picture comprising the portrait, wherein the size of the picture is indicated by the number of pixels;

determining deformation amounts of all the preset control points, wherein the deformation amounts of the control points are two-dimensional vectors;

dividing the picture comprising the portrait into multiple grids according to the size of the picture and the deformation amounts of the preset control points;

determining a grid deformation field according to the preset control points and a preset spline function, wherein: when a difference amount between deformation amounts of a preset control point before and after the corresponding grid is deformed meets a precision requirement, the grid deformation field is determined as a grid field formed by multiple grids formed by deformation amounts of grid vertexes of grids corresponding the preset control points; and when the difference amount does not meet the precision requirement, the difference amount is used as an updated deformation amount of the preset control point for deforming the corresponding grid and calculating an updated difference amount, until the updated difference amount is determined to meet the precision requirement;

determining a pixel deformation field according to the grid deformation field and relative positions of pixels in a grid before the grid is deformed; and combining the grid deformation field and the pixel deformation field, to obtain the deformation field of the facial feature.

14. The non-transitory computer readable storage medium according to claim 13, wherein detecting a facial feature of the portrait in the picture further comprises:

selecting a method for detecting a facial feature, wherein the method for detecting a facial feature is an active shape model (ASM) method or an active appearance model (AAM) method; and detecting the facial feature of the portrait in the picture by using the selected method for detecting a facial feature.

15. The non-transitory computer readable storage medium according to claim 13, wherein dividing the picture comprising the portrait into multiple grids according to the size of the picture and the deformation amounts of the preset control points further comprises:

selecting a maximum value from the deformation amounts of all the preset control points; and dividing the picture comprising the portrait into multiple grids according to the size of the picture and the selected maximum value.

16. The non-transitory computer readable storage medium according to claim 13, wherein determining a grid deformation field according to the preset control points and a preset spline function further comprises:

step A: determining, according to a deformation amount of a control point, deformation amounts of grid vertexes of a grid to which the control point belongs;

step B: determining a deformation amount of a current control point according to the determined deformation amounts of the grid vertexes of the grid;

step C: subtracting the deformation amount, which is determined after the grid is deformed, of the current control point from the deformation amount of the control point before the grid is deformed, to obtain a remaining deformation amount of the control point; and step D: determining whether the remaining deformation amount of the control point meets a precision requirement, if yes, using a grid field formed by multiple grids formed by determined deformation amounts of grid vertexes of grids to which control points belong as the grid deformation field, and if not, using the remaining deformation amount of the control point as a new deformation amount of the control point, and going back to step A.

17. The non-transitory computer readable storage medium according to claim 13, wherein when the current control point meets the precision requirement, determining a pixel deformation field according to the grid deformation field and relative positions of pixels in a grid before the grid is deformed further comprises:

determining a relative position of a pixel in a deformed grid after each free-form deformation (FFD); and superimposing the determined relative position of the pixel in the deformed grid after each FFD, to obtain the pixel deformation field.

18. The non-transitory computer readable storage medium according to claim 17, wherein determining a relative position of a pixel in a deformed grid after each FFD further comprises:

determining a relative position of the pixel to a grid vertex, closest to the pixel, of the grid before the grid is deformed;

determining a relative position of the grid vertex of the grid before the grid is deformed to a grid vertex that is obtained after the grid vertex of the grid is deformed; and determining the relative position of the pixel in the deformed grid according to the determined relative position of the pixel to the grid vertex, closest to the pixel, of the grid before the grid is deformed and the relative position of the grid vertex of the grid before the grid is deformed to the grid vertex that is obtained after the grid vertex of the grid before the grid is deformed is deformed.

* * * * *